(12) United States Patent
Stiller

(10) Patent No.: US 9,764,958 B2
(45) Date of Patent: *Sep. 19, 2017

(54) PROCESS FOR PURE CARBON PRODUCTION, COMPOSITIONS, AND METHODS THEREOF

(71) Applicant: West Virginia University Research Corporation, Morgantown, WV (US)

(72) Inventor: Alfred Stiller, Morgantown, WV (US)

(73) Assignee: WEST VIRGINIA UNIVERSITY RESEARCH CORPORATION, Morgantown, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/772,629

(22) PCT Filed: Mar. 14, 2014

(86) PCT No.: PCT/US2014/028755
§ 371 (c)(1),
(2) Date: Sep. 3, 2015

(87) PCT Pub. No.: WO2014/144374
PCT Pub. Date: Sep. 18, 2014

(65) Prior Publication Data
US 2016/0002049 A1    Jan. 7, 2016

Related U.S. Application Data

(60) Provisional application No. 61/798,198, filed on Mar. 15, 2013.

(51) Int. Cl.
C01F 11/28    (2006.01)
C01F 7/58    (2006.01)
(Continued)

(52) U.S. Cl.
CPC .............. C01B 31/06 (2013.01); C01B 31/02 (2013.01); C01B 31/0446 (2013.01);
(Continued)

(58) Field of Classification Search
None
See application file for complete search history.

(56) References Cited

U.S. PATENT DOCUMENTS

| 380,775 A | 4/1888 | Thowless |
| 1,271,713 A | 7/1918 | Hutchins |

(Continued)

FOREIGN PATENT DOCUMENTS

| CN | 1590288 A | 3/2005 |
| CN | 102390828 A | 3/2012 |

(Continued)

OTHER PUBLICATIONS

Gogotsi et al.; Carbide-Derived Carbons—From Porous Networks to Nanotubes and Graphene; Advanced Functional Materials; 21, 810-833; 2011.*

(Continued)

*Primary Examiner* — Guinever S Gregorio
(74) *Attorney, Agent, or Firm* — The Marbury Law Group, PLLC

(57) ABSTRACT

The disclosure provides for methods of oxidizing carbide anions, or negative ions, from salt like carbides at temperatures from about 150° C. to about 750° C. In another aspect, the disclosure provides for reactions with intermediate transition metal carbides. In yet another aspect, the disclosure provides for a system of reactions where salt-like carbide anions and intermediate carbide anions are oxidized to produce pure carbon of various allotropes.

83 Claims, 2 Drawing Sheets

Enthalpies of formation for allotropes of carbon

(51) Int. Cl.
  *C01B 31/06* (2006.01)
  *C01B 31/02* (2006.01)
  *C01B 31/04* (2006.01)
  *C01B 31/32* (2006.01)
(52) U.S. Cl.
  CPC .............. *C01B 31/32* (2013.01); *C01F 7/58* (2013.01); *C01F 11/28* (2013.01)

(56) References Cited

U.S. PATENT DOCUMENTS

| | | | |
|---|---|---|---|
| 1,319,148 A | 10/1919 | Freeman | |
| 1,528,824 A | 3/1925 | Hackspill et al. | |
| 2,323,597 A | 7/1941 | Hansgirg | |
| 2,382,713 A | 8/1945 | Hansgirg | |
| 2,729,689 A | 1/1956 | Blanchard et al. | |
| 2,739,041 A | 3/1956 | Andersen | |
| 2,813,017 A | 11/1957 | Mathieu | |
| 3,031,413 A * | 4/1962 | Barber | C01B 31/301 252/182.32 |
| 3,066,099 A | 11/1962 | Mohun | |
| 4,105,440 A | 8/1978 | Gentaz et al. | |
| 4,275,050 A * | 6/1981 | French | C01B 31/02 423/445 R |
| 4,738,759 A | 4/1988 | Bienvenu et al. | |
| 4,820,339 A | 4/1989 | Bienvenu et al. | |
| 4,990,403 A | 2/1991 | Ito | |
| 5,384,016 A | 1/1995 | Lin et al. | |
| 5,560,898 A | 10/1996 | Uchida et al. | |
| 5,680,292 A | 10/1997 | Thompson, Jr. et al. | |
| 6,479,028 B1 | 11/2002 | Kaner et al. | |
| 6,579,833 B1 | 6/2003 | McNallan et al. | |
| 7,025,945 B2 | 4/2006 | Nishi et al. | |
| 7,744,843 B2 | 6/2010 | Gogotsi | |
| 8,242,030 B2 | 8/2012 | Hannon et al. | |
| 2001/0047980 A1 | 12/2001 | McNallan et al. | |
| 2005/0058875 A1 | 3/2005 | Jerome | |
| 2006/0068125 A1 | 3/2006 | Radhakrishnan | |
| 2006/0140846 A1 | 6/2006 | Leis et al. | |
| 2006/0165584 A1 | 7/2006 | Gogotsi et al. | |
| 2006/0165988 A1 | 7/2006 | Chiang et al. | |
| 2006/0251565 A1 | 11/2006 | Leis et al. | |
| 2008/0169749 A1 | 7/2008 | Kim et al. | |
| 2008/0219913 A1 | 9/2008 | Gogotsi | |
| 2008/0248310 A1 | 10/2008 | Kim et al. | |
| 2009/0036302 A1 | 2/2009 | Gogotsi et al. | |
| 2009/0117094 A1 | 5/2009 | Leis et al. | |
| 2009/0213529 A1 | 8/2009 | Gogotsi et al. | |
| 2009/0258782 A1 | 10/2009 | Gogotsi | |
| 2009/0301902 A1 | 12/2009 | Gogotsi et al. | |
| 2010/0012576 A1 | 1/2010 | Hoffman et al. | |
| 2011/0033366 A1 | 2/2011 | Wagner | |
| 2011/0287174 A1 | 11/2011 | Calabrese Barton et al. | |
| 2011/0290655 A1* | 12/2011 | Nishikiori | C25D 9/04 205/230 |
| 2012/0148473 A1 | 6/2012 | Kramarenko | |
| 2012/0219488 A1 | 8/2012 | Dash | |
| 2014/0142007 A1 | 5/2014 | Lim et al. | |
| 2014/0271441 A1 | 9/2014 | Stiller | |
| 2015/0071847 A1 | 3/2015 | Ishikawa et al. | |
| 2015/0191355 A1 | 7/2015 | Kang et al. | |
| 2015/0210547 A1 | 7/2015 | Kang et al. | |

FOREIGN PATENT DOCUMENTS

| | | |
|---|---|---|
| CN | 103436904 A | 12/2013 |
| DE | 1667532 | 6/1971 |
| DE | 259147 A1 | 8/1988 |
| EP | 1916233 A1 | 4/2008 |
| JP | 58-501430 | 8/1983 |
| JP | H-07-048111 | 2/1995 |
| JP | 11302826 | 11/1999 |
| JP | 2008-105922 A | 5/2008 |
| JP | 2008-542184 | 11/2008 |
| JP | 2012-166980 | 9/2012 |
| KR | 10-1472313 | 12/2014 |
| RU | 2181795 C2 | 4/2002 |
| SU | 996324 A1 | 2/1983 |
| SU | 1175869 A1 | 8/1985 |
| WO | WO 83/00038 | 1/1983 |
| WO | WO 01/16054 | 3/2001 |
| WO | WO 02/086180 | 10/2002 |
| WO | WO 2004/094307 A1 | 4/2004 |
| WO | WO 2006/127017 A2 | 11/2006 |
| WO | WO 2014/019880 A1 | 2/2014 |
| WO | WO 2014/144374 | 9/2014 |

OTHER PUBLICATIONS

Morris et al., "Galvanic Cell Studies Involving Calcium Carbide Solutions", J. Electrochem. Soc., 1973, 120, 4, 570-575.

Boehm et al., "Structural Parameters and Molecular Sieve Properties of Carbons Prepared from Metal Carbides", Proc. 12th Biennial Conf. on Carbon, 149-150, Pergamon, Oxford, 1975.

Invitation to pay additional fees and partial search report received in connection with international application No. PCT/US2015/056175; dated Feb. 12, 2016.

Kuklak et al., "Electrodeposition of Nanostructural Diamond-like Films by Oxidation of Lithium Acetylide", Electrochemistry Communications, vol. 5, Issue 4, Apr. 2003, pp. 301-305.

PCT International Search Report, International Application No. PCT/US14/028755, dated Sep. 19, 2014, pp. 1-3.

International Search Report and Written Opinion received in connection with, International Application No. PCT/US2015/056175, dated May 30, 2016.

Anonymous: "Graphit—Wikipedia", Jul. 15, 2014 (Jul. 15, 2014), XP055273296, Retrieved from the Internet: URL:https://de.wikipedia.org/w/index.php?title=Graphit&oldid=132168437 [retrieved on May 18, 2016].

Anonymous: "Graphene—Wikipedia, the free encyclopedia", Aug. 17, 2014 (Aug. 17, 2014), XP055273317, Retrieved from the Internet: URL:https://en.wikipedia.org/w/index.phptitle=Graphene&oldid=621692371 [retrieved on May 18, 2016].

Anonymous: "Diamond—Wikipedia, the free encyclopedia", Aug. 5, 2014 (Aug. 5, 2014), XP055273274, Retrieved from the Internet: URL:https://en.wikipedia.org/w/index.phptitle=Diamond&oldid=620007262 [retrieved on May 18, 2016].

Bae et al: "Roll-to-roll production of 30-inch graphene films for transparent electrodes", Nature Nanotechnology, val. 5, No. 8, Aug. 1, 2010 (Aug. 1, 2010), pp. 574-578, XP055049935, ISSN: 1748-3387, DOI: 10.1038/nnano.2010.132.

Camargo et al., "Carbide-Derived Carbon by Electrochemical Etching of Vanadium Carbides", J. Electrochem. Soc.., 2015, 162, 10, H811-H815.

Carbon Nanomaterials, 2nd Ed., CRC Press, 2014, Chapter 11, "Carbide-Derived Carbon," (Y. Korenblit et al.), pp. 303-329.

Dai et al., "Synthesis of nanostructured carbon by chlorination of calcium carbide at moderate temperatures and its performance evaluation", Mat. Chem. Phys., 112, 2, 2008, pp. 461-465.

Gogotsi, (Ed.), Carbon Nanomaterials, 2006, Chapter 6, "Carbide-Derived Carbon," (G. Yushin et al.), pp. 211-254.

Gogotsi et al., "Nanoporous Carbide Derived Carbon with Tunable Pore Size", Nature Materials, vol. 2 (9), 2003, 591-594 (Retrieved from http://repository.upenn.edu/mse_papers/60).

Han et al., "Preparation of Carbon Nano-Onions and Their Applicatio as Anode Materials for Rechargeable Lithium-Ion Batteries", J. Phys. Chem. C2011, 115, pp. 8923-8927.

Kawamura et al, "Electrodeposition of cohesive carbon films on aluminum in a LiCl—KCl—K2CO3 melt", J. Appl. Electrochem., 30: 571 (2000).

Lukatskaya et al., Room-Temperature Carbide-Derived Carbon Synthesis by Electrochemical Etching of MAX Phases, Angew. Chem. Int. Ed. Engl. , vol. 53, 19, pp. 4887-4880 (2014).

Morishita et al, "Carbon-coated tungsten and molybdenum carbides for electrode of electrochemical capacitor",Electrochemica Acta, 52, 7, Feb. 1, 2007, 2478.

Pang et al. , "Synthesis of Carbon Spheres via a Low-Temperature Metathesis Reaction", J. Phys. Chem. C, 2008, 112, 12134-12137.

(56) References Cited

OTHER PUBLICATIONS

Pillai et al., "Solid-State Synthesis of Calcium Carbide by Using 2.45 GHz Microwave Reactor", Ind. Eng. Chem. Res. 2015, 54(44) 11001-11010, 2015.
Xie et al., "Preparation of high purity carbon nanospheres by the chemical reaction of calcium carbide and oxalic acid", Carbon, 2009, 47, 2292-2295.
Xie et al., "Chemical reactions between calcium carbide and chlorohydrocarbon used for the synthesis of carbon spheres containing well-ordered graphite", Carbon 2010, 48, 2023-2029.
Xie et al., "Low temperature synthesis of high quality carbon nanospheres through the chemical reactions between calcium carbide and oxalic acid", Mater. Chem. Phys., 2010, 124, 482-487.
Zheng et al., "The preparation and performance of calcium carbide-derived carbon/polyaniline composite electrode material for supercapacitors", J. Power Sources, 195, 6, Mar. 5, 2010, 1747.
Senthilnathan et al., "Synthesis of carbon films by electrochemical etching of SiC with hydrofluoric acid in nonaqueous solvents", Carbon, 71 (2014) pp. 181-189.
Osetzky, "Macrocrystalline Graphite From Magnesium Carbide", Carbon, vol. 12, pp. 517-523, (1974).
Fedorov et al., "Mesoporous carbon Adsorbents from Calcium Carbide", J. Appl. Chem. USSR, 54, 2253-2255, (1982).
Federov et al, "Theoretical Foundations of Carbide-Thermal Technology for Production of Activated Carbon and Sorption-Active Materials", Russ J. Appl. Chem., vol. 71, 584-588, (1998).
Federov et al., "Production, Pore Structure, Adsorption Properties, and Fields of Application of Composite Sorbents from Calcium Carbide", Russ. J. Appl. Chem., vol. 71, 795-798, (1998).
Ivakhnyuk, Z. Prikladnoi Khimii, 60, 852-856, 1987.
Ivakhnyuk, Z. Prikladnoi Khimii, 60, 1413-1415, 1987.
Samonin, Z. Prikladnoi Khimii, 60, 2357-2358, 1987.
Atkins, Elements of Physical Chemistry, $5^{th}$ Ed. (2009) NIST webbook (Table of Contents only).
Banhart, "Chains of carbon atoms: A vision or a new nanomaterial?", Beilstein J. of nanotechnology, vol. 6, (2015) pp. 559-569.
Bonaccorso et al., "Production and processing of graphene and 2d crystals", Materials Today, vol. 15(12), (2012) pp. 564-589.
Chen, Electrodeposition of Diamond-Like Carbon Films, Thesis, 2002, Univ. N. Texas.
Cherkasov et al., "Bomb calorimetry as a bulk characterization tool for carbon nanostructures", Carbon, vol. 63, pp. 324-329 (2013).
Chu et al., "Characterization of amorphous and nanocrystalline carbon films", Materials Chemistry and Physics, 96 (2006) pp. 253-277.
Cotton & Wilkinson, Ed., Advanced Inorganic Chemistry, 4th ed., 1980, pp. 361-363.
Gogotsi et al., "Formation of $sp^3$-bonded carbon upon hydrothermal treatment of SiC", Diamond and Related Materials, vol. 5 (1996), pp. 151-162.
Kraft et al., "Carbon formed by hydrothermal treatment of α-SiC crystals",J. Mater. Chem., vol. 10, (2000) pp. 671-680.
Presser, "Oxidation and Wet Wear of Silicon Carbide", PhD dissertation, Universität Tübingen, (2009).
Wu et al.,"The effects of electrolyte on the supercapacitive performance of activated calcium carbide-derived carbon", Journal of Power Sources, vol. 226 (2013), pp. 202-209.
Yolshina et l., "A novel electrochemical method for the synthesis of boron doped graphene in the molten salt electrolyte", Synthetic Metals, 205 (2015): 85-91.
International Preliminary Report on Patentability received in connection with International Application No. PCT/US2014/028755dated Sep. 15, 2015.

\* cited by examiner

PROCESS FOR PURE CARBON PRODUCTION, COMPOSITIONS, AND METHODS THEREOF

CROSS-REFERENCE TO RELATED APPLICATIONS

This application is filed under 35 U.S.C. §371 as a National Phase of International Application No. PCT/US14/028755, which was filed on Mar. 14, 2014 which claims priority to U.S. Provisional Application No. 61/798,198, filed Mar. 15, 2013, and is incorporated herein by reference in its entirety.

FIELD

The disclosure provides for methods of oxidizing carbide anions, or negative ions, from salt like carbides at temperatures from about 150° C. to about 750° C. In another aspect, the disclosure provides for reactions with intermediate transition metal carbides. In yet another aspect, the disclosure provides for a system of reactions where salt-like carbide anions and intermediate carbide anions are oxidized to produce pure carbon of various allotropes.

BACKGROUND

Carbides are chemical compounds containing carbon and an element with lower electronegativity, or less of an ability to attract electrons. Nearly all elements react with elemental carbon to produce carbides. They are further classified into four groups: salt-like carbides, covalent carbides, interstitial carbides, and intermediate transition metal carbides. Salt-like carbides react with water and dilute acids to produce ions and hydrocarbon gases. Intermediate transition metal carbides also react with dilute acid and sometimes water to produce metallic cations, hydrocarbons and sometimes hydrogen.

Salt-like carbides are further broken down into methanides, acetylides, and sesquicarbides. Methanides react with water to produce methane. Methane is a carbon atom bonded to four hydrogen atoms in an sp3 hybridization. Two examples of methanides are aluminum carbide ($Al_4C_3$) and beryllium carbide ($Be_2C$). Acetylides are salts of the acetylide anion $C_2^{-2}$ and also have a triple bond between the two carbon atoms. Triple bonded carbon has an sp1 hybridization and two examples of acetylides are sodium carbide ($Na_2C_2$) and calcium carbide ($CaC_2$). Sesquicarbides contain the polyatomic anion $C_3^{-4}$ and contains carbon atoms with an sp1 hybridization. Two examples of sesquicarbides are magnesium ($Mg_2C_3$) and lithium ($Li_4C_3$).

U.S. Pat. No. 1,319,148 defined an oxidization reaction to produce potassium metal by reacting potassium cations (positive ions) with acetylide anions from calcium carbide. The reacting medium was molten potassium fluoride (mp=876° C.). This is shown in the reaction in Scheme (1) below.

Scheme I

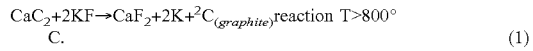

(1)

The other products of this reaction are calcium fluoride and graphite. Graphite is the most thermodynamically stable form of elemental carbon, and this is therefore the favored product at high temperature. This reaction, the reduction of the potassium ion, takes place above 800° C. which would be considered high temperature since 600° C. is red heat.

Alkali metals can be prepared from electrolysis of molten salts. However, U.S. Pat. No. 1,319,148 indicates that an oxidization reaction was used to make alkali metals. Additionally, Concepts and Models of Inorganic Chemistry; Douglas B. McDaniel D. 1965 Xerox Corp. describes how they purified alkali metals before the electrolysis of the molten salts came into use.

To produce the alkali metal, the temperature is above the melting point of KF (mp=858° C.) which is high enough to vaporize K. (bp=744° C.). The products were indicated as being $CaF_2$, $K°$, and the most thermodynamically stable form of carbon, graphite, $C_{(graphite)}$.

SUMMARY

The disclosure provides for a method of oxidizing carbide anions and/or negative ions from carbides by oxidizing carbide anions at a reaction temperature of from about 150° C. to about 750° C., wherein the reaction produces an allotrope of carbon in an sp1 and/or sp3 configuration.

In another aspect, the disclosure provides for a method of producing pure elemental allotropes of carbon by oxidizing salt-like carbide anions and/or intermediate carbide anions at a reaction temperature of from about 150° C. to about 750° C.

In yet another aspect, the disclosure provides for a method of producing diamonds by reacting carbides with molten metallic halide salts at a reaction temperature at a reaction temperature of from about 150° C. to about 750° C.

The disclosure also provides for a method of controlling a carbon allotrope by controlling the reduction potential of a low melting point halide salt reactant by varying the reduction potential of cations and/or changing the temperature of the melt.

In an aspect, the carbide anions are salt-like or intermediate carbide anions. In another aspect, the salt-like carbide anions are selected from the group consisting of methanides, acetylides, and sesquicarbides. In another aspect, the salt-like carbide anion is calcium carbide.

In an aspect, the methods described herein produce an allotrope of carbon in an sp1 configuration. In yet another aspect, the methods described herein produce an allotrope of carbon in an sp3 configuration.

The disclosure also provides for methods described herein wherein the reaction temperature is below about 150° C., below about 200° C., below about 250° C., below about 300° C., below about 400° C., below about 500° C., below about 600° C., below about 700° C., or below about 800° C.

In yet another aspect, the disclosure provides for methods of oxidizing carbide anions, or negative ions, from salt like carbides at temperatures in a range from about 150° C. to about 200° C., from about 150° C. to about 250° C., from about 200° C. to about 250° C., from about 200° C. to about 300° C., from about 200° C. to about 350° C., from about 200° C. to about 400° C., from about 250° C. to about 400° C., from about 200° C. to about 500° C., from about 250° C. to about 500° C., from about 300° C. to about 600° C., from about 400° C. to about 600° C., from about 500° C. to about 700° C., from about 200° C. to about 700° C., from about 250° C. to about 750° C., from about 150° C. to about 750° C., from about 150° C. to less than 800° C., from about 250° C. to less than 800° C., from about 300° C. to less than 800° C., from about 400° C. to less than 800° C., from about 500° C. to less than 800° C., or from about 600° C. to less than 800° C.

DETAILED DESCRIPTION

Figure 2:
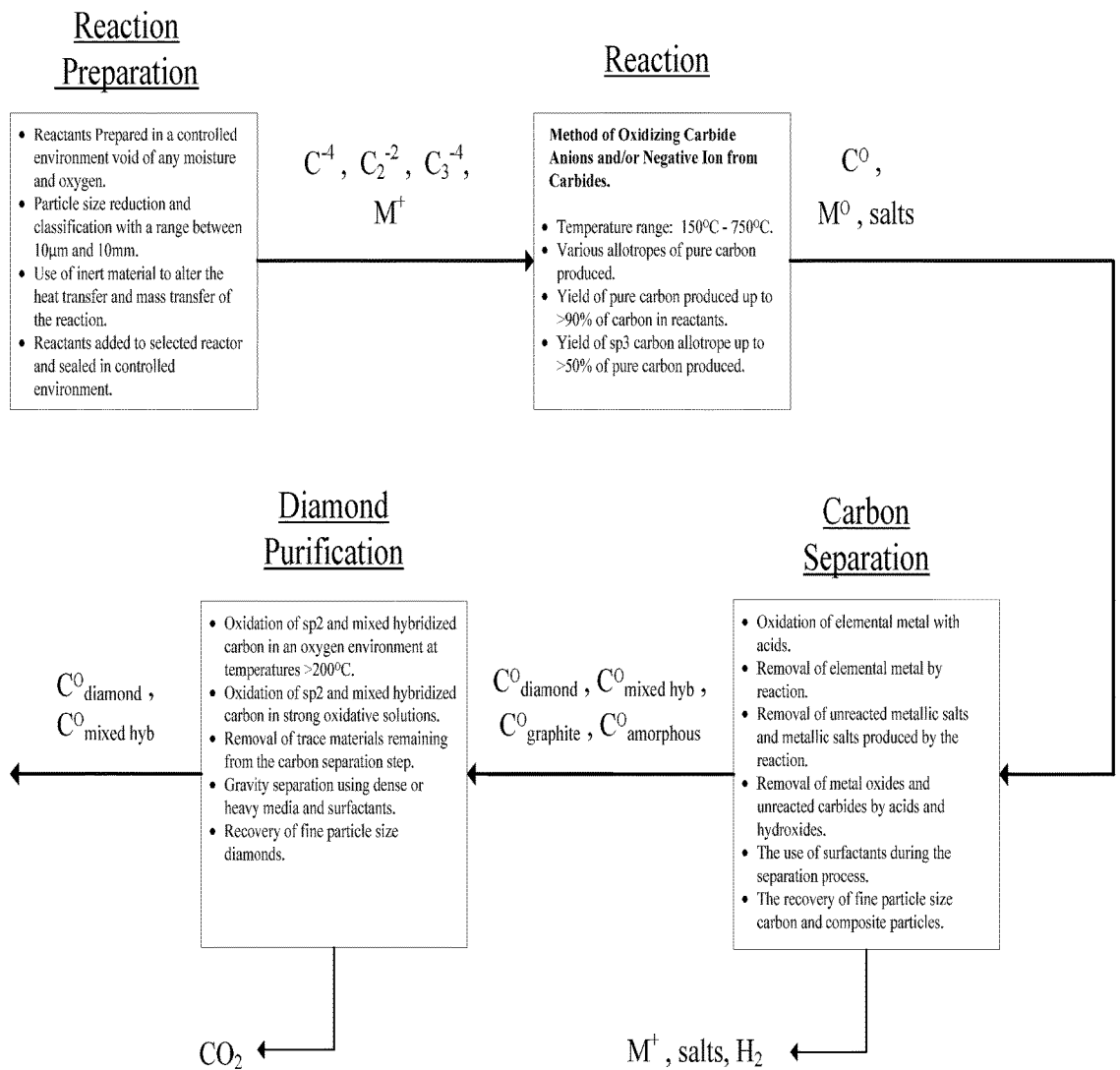
FIG. 2 provides for a representative block flow diagram for formation of various allotropes of carbon, including a (1) reaction preparation, (2) chemical reaction, (3) carbon separation, and (4) diamond purification aspect.

In an aspect, the disclosure provides for a method of diamond production comprising, consisting of, or consisting essentially of (1) reaction preparation, (2) chemical reaction, (3) separation, and (4) purification methodologies described herein. A representative methodology is described in FIG. 2.

In an aspect, the process starts by preparing the reactor in the controlled atmosphere void of moisture and oxygen (1). In an aspect, the chemical reaction (2) follows the reaction preparation portion. In another aspect, the separation and purification aspects follow the chemical reaction (2). In yet another aspect, the separation and purification aspects follow the chemical reaction (2) because the separation (3) is defined by the removal of material that is not elemental carbon from the products of the chemical reaction (2) and the purification (4) is the removal of any undesired elemental carbon produced by the chemical reaction as well as any other trace materials remaining from the separation (3).

The (1) reaction preparation aspect of the process deals with preparing the reactants to control the variables and the conditions of reaction; (2) the chemical reaction of the respective reactants in a manner that is described herein; (3) the Separation aspect includes the initial removal of the un-reacted carbides and metallic salts, the metallic salts produced by the reaction, the elemental metals produced by the reaction, and any/or metal oxide produced; and the (4) Purification aspect is where the product is produced, for example, diamonds. In an embodiment, (4) the purification aspect of the process can include the removal of the sp2 and mixed hybridization carbon produced by the reaction along with the removal of any remaining carbides, metallic salts, elemental metals, and metal oxides. In another aspect, the disclosure provides for a method of carbon production comprising, consisting of, or consisting essentially of any of the sub groups described in the (1) reaction preparation, (2) chemical reaction, (3) separation, and (4) purification methodologies described herein.

While, in an aspect, the overall process of producing diamonds can involve at least three parts in an aspect, the disclosure also provides for a method of streamlining this process by combining (3) separation and (4) purification aspects into a single aspect or single step. For example, in an aspect, the disclosure provides for a method comprising, consisting of, consisting essentially of (1) reaction preparation, (2) chemical reaction, and (3) separation and the (4) purification methodologies as described herein.

(1) Reaction Preparation:

Reaction Preparation in a Moisture Free Environment:

Different salt like and intermediate carbides react with water and/or dilute acids to produce hydrocarbon gases and metal oxide. Almost all salt like and intermediate carbides also react with moisture in the air. The reaction rate increases, as the carbide is ground to the smaller particle sizes due to the increase in surface area exposed to the environment. Certain reactants, for instance aluminum carbide, will react with the moisture in the air to produce alumina (aluminum oxide) which can complicate the separation process. In an aspect, the disclosure provides a method of removing the elemental metals and metal oxides from the products of the reaction using dilute or concentrated acid while the elemental carbon produced by the reaction remains unchanged.

In addition, metal salts, such as halide reactants, can also attract moisture from the air to form a solution of the ions in water. Any moisture accumulated in the salt can enter the reactor and react with the carbide. The moisture can also vaporize at the reaction temperature increasing the pressure and altering the reaction conditions. Therefore, in an aspect, the reactants can be loaded in an atmosphere controlled glove box. In another aspect, the reaction conditions include an environment void of any moisture and oxygen. To accomplish such a moisture free environment, the atmosphere can be prepared by flushing the glove box many times with dry inert gas, for example, but not limited to, argon. Additional steps can be taken to further reduce and control the moisture in the glove box. These steps can include, for example, using a metallic salt as a desiccant inside the glove box and a circulation system, which may include a fine particle separator and several moisture separators. In an aspect, the glove box loading procedure includes evacuating the transfer chamber several times to remove or minimize any moisture from entering the controlled atmosphere.

In an aspect, the disclosure provides for a method of preparing the reactants and the reactor in an inert environment where the reactants remain unchanged chemically prior to the start of the reaction. In another aspect, the inert environment is void or substantially void of oxygen and moisture. In an aspect, the inert environment contains only trace amounts of oxygen and moisture. In yet another aspect, only the physical properties of the reactant are altered prior to the start of the reaction.

Reaction Preparation in an Oxygen Free Environment:

In an aspect, preparation in an oxygen free environment is similar to preparation in a moisture free environment. The preparation can be accomplished in a glove box that has been flushed multiple times with a dry inert gas. In an aspect, one difference between the reaction preparation in an "oxygen free environment" verses a "moisture free environment" is the removal of any trace amounts of oxygen remaining in the glove box after the inert gas flush along with the trace amounts of oxygen entering from the transfer chamber when materials are loaded and unloaded. In an aspect, to remove the trace amounts of oxygen, an oxygen scrubber or series of scrubbers, depending upon the reactants used and the other conditions of the reaction, can be added to the glove box circulation system. The circulation can also be designed to add additional items or bypass existing ones to achieve the proper conditions for any carbide and metallic salts to be analyzed as reactants.

Reducing the Particle Size of the Carbide:

Many of the commercially available carbides are of the size of gravel, so the particle size, generally, may be reduced to the size required for the reaction. In order to reduce the particle size of the carbide, the disclosure provides a method to be used inside the glove box. In an aspect of this method, the carbide is first cut into smaller pieces using a tile cutter, then crushed with a pair of channel locks pliers, and finally ground to the proper particle size using a mortar and pestle. The crushed carbide is thereafter passed through a series of sieves to collect the desired particle size carbide for the process. As an alternative to the above-described method, a small hand-operated roller mill or suitable crushing device, which can be adjusted to create the desired particle size for the experiments, can be used to produce the proper sized carbide particles.

In an aspect, the reaction described herein is a diffusion controlled reaction. As such, the rate of reaction will be controlled by the overall surface area available for reaction. The rate of reaction includes properties such as porosity of the carbide and viscosity of the liquid medium, not just the particle size of the reactant. In an aspect, the aluminum carbide has a particle size of −300 mesh (44 microns) and the calcium carbide is in the form of gravel. In another aspect, the calcium carbide is crushed to particle sizes of −20 mesh to −6 mesh. In yet another aspect, the calcium carbide is size is from about 10 microns to about 5 millimeters, from about 30 microns to about 3 millimeters, from about 100 microns to about 2 millimeters, or from about 30 microns to about 200 microns.

Reactor Shape and Orientation:

Through experimentation and analysis of the materials produced by the reaction, it was determined that once the metallic salts became molten and the reactants were in a liquid solution and the contents of the reactor reach steady-state (this is also given that the reactor is not agitated), the different material inside the reactor separated into layers based on their respective specific gravities. Carbides do not dissolve in the molten salts. Therefore, the reaction is between a solid phase and a liquid phase. It is not homogenous. The reaction takes place at the contact surfaces of the molten salt and solid carbide. Such a mechanism further confirms why surface area, in an aspect, can be an important parameter to consider. Therefore, in an aspect, the reaction can occur at one vertical height where the reactants were physically able to come together under the proper conditions to react.

In an aspect, it is advantageous to limit the contact surface of our reactor configuration to have a limited contact area. This is another parameter which has an influence on the kinetics of the diffusion controlled reaction in reaction systems described herein, which is non-turbulent inside of the reactor. Limiting the contact area allows the reaction to proceed at a rate slow enough so that the latent heat of crystallization does not increase the temperature of the contact area to a point that sp2 carbon is produced. So this parameter is influenced by the other reaction conditions. The importance of the parameter can also decrease if we agitate the reactor. Any means that has the ability to increase the contact area would make a higher effective reaction zone. This can also be accomplished, for example, by changing reactor orientation or by stirring. As a result, different reactor designs and orientations may be utilized in an attempt to maximize the surface area of the horizontal interface where the reaction can occur. In an aspect, the reactor prepared in the glove box is made of glass and the reactants are loaded inside. The glass reactor can be sealed in a stainless steel tube so it can be removed from the glove box and the controlled atmosphere conditions can be maintained inside throughout the reaction process. Initially, the reactors included simple glass test tubes which varied in diameter based on the desired mass and ratio of the reactants to be used.

To increase the surface area of the horizontal interface where the reaction occurs, the height of the reactors are decreased while maintaining the same amount of material that the reactors can hold. One way to accomplish this is by orienting the reactors in the horizontal rather than the vertical direction. But, because the reaction occurs in a liquid medium, the open top test tube style reactors may not be sufficient. As a result, for some experiments described herein, ampoule style glass reactors were utilized. This design provides for both a simple and effective design.

In an aspect, the disclosure provides for a method of altering the dimensions and orientation of the chemical reaction vessel to control the surface area, shape, and thickness of the reaction interface.

In an aspect, several of the horizontally oriented reactors are progressing through the purification part of the process. This has led to unexpectedly good results. In another attempt to increase the interface surface area, in an aspect, multiple glass Petri dishes are stacked one on top of the next in the same stainless steel tube. This allows for numerous, large surface area reaction interfaces to be contained in the same stainless steel tube.

(2) Chemical Reaction:

Methods of Oxidizing Carbide Anions and/or Negative Ions from Carbides

In an aspect, the disclosure provides for methods of oxidizing carbide anions, or negative ions, from salt like carbides at low temperatures below about 600° C. In another aspect, the disclosure provides for methods of oxidizing carbide anions, or negative ions, from salt like carbides at temperatures below about 150° C., below about 200° C., below about 250° C., below about 300° C., below about 400° C., below about 500° C., below about 600° C., below about 700° C., or below about 800° C. In yet another aspect, the disclosure provides for methods of oxidizing carbide anions, or negative ions, from salt like carbides at temperatures in a range from about 150° C. to about 200° C., from about 150° C. to about 250° C., from about 200° C. to about 250° C., from about 200° C. to about 300° C., from about 200° C. to about 350° C., from about 200° C. to about 400° C., from about 250° C. to about 400° C., from about 200° C. to about 500° C., from about 250° C. to about 500° C., from about 300° C. to about 600° C., from about 400° C. to about 600° C., from about 500° C. to about 700° C., from about 200° C. to about 700° C., from about 250° C. to about 750° C., from about 150° C. to about 750° C., from about 150° C. to less than 800° C., from about 250° C. to less than 800° C., from about 300° C. to less than 800° C., from about 400° C. to less than 800° C., from about 500° C. to less than 800° C., or from about 600° C. to less than 800° C.

Oxidization means that the ion being oxidized gives up electrons. The negative ions of the salt like carbides are reacted to produce elemental carbon in its various allotropes, or crystal structures, with sp1, sp2, and/or sp3 hybridizations. In another aspect, the disclosure provides for reactions with intermediate transition metal carbides. In yet another aspect, the disclosure provides for a system of reactions where salt-like carbide anions and intermediate carbide anions are oxidized to produce pure carbon of various allotropes.

In an aspect, the first step of the reaction system is to oxidize the carbide ions at temperatures described herein. The reactions use low melting point salts, for example stannous chloride ($SnCl_2$), that have melting points less than 280° C. as the reactants. The reaction medium is the molten salt, for example, molten stannous chloride. This means that there is an excess of salt during the reaction which takes place in the molten salt liquid. Chemically, the cation (positive ion) of the salt is reduced to the elemental state. Therefore, the stannous ion $Sn^{+2}$ would become elemental tin ($Sn°$). The standard reduction potential of the stannous ion $Sn^{+2}$ is only about −0.136V. Reduction potential refers to the ability of a chemical species to acquire electrons and thus have its charge reduced. So not much energy is required to reduce the stannous ion, therefore the reaction reacts to completion. There is an excess of reduction potential in the carbide anions since they are shown to reduce the potassium ion in Equation (1) which requires −2.94V.

The reduction of $Sn^{+2}$ by acetylide or any carbide anion is not mentioned anywhere in the literature. Only certain metallic salts are applicable for this reaction. It is preferred that the cation of the salt does not produce a carbide by direct reaction with carbon at low temperatures or the temperature of the reduction reaction. If the cation does produce carbide, then pure carbon would not be produced. Examples of the preferred salts contain tin, lead, mercury, and zinc. Furthermore, the salts must have a low melting point. The temperature of the reaction must be high enough to melt the salts but low enough to control the electronic hybridization of the carbon. As mentioned in the background information, graphite is the most thermodynamically stable form of pure carbon. So if the temperature of the reaction is too high, the pure carbon will form crystalline graphite in the sp2 hybridization instead of the desired sp1 or sp3 hybridizations.

The next item in the reaction system is the low temperature oxidation of methanides to produce diamond, or carbon in that has an sp3 hybridization. Aluminum carbide ($Al_4C_3$) and beryllium carbide ($Be_2C$) are the only two known salt like carbides that produce methane when they react with water. The methane molecule contains a carbon atom in the sp3 hybridized state, which is the same as diamond. The idea is to oxidize the methanide anion in a controlled manner at temperatures low enough to maintain the electronic configuration, or sp3 hybridization and produce diamond. Thus, the controlled oxidization of aluminum carbide at low enough temperatures will preferentially produce diamonds. This reduction takes place at about 280° C. and atmospheric pressure.

Oxidation of the methanide (aluminum carbide) anion in molten tin halide salt blends to produce diamond. There is no literature that mentions the reduction of aluminum carbide much less anything that mentions this reaction to produce diamond, or sp3 hybridized carbon. Experiments for this reaction have been carried out using stannous fluoride ($SnF_2$) and stannous chloride ($SnCl_2$), which have melting points of 214° C. and 235° C., respectively. These reactions can be seen in Equation (2) and Equation (3) below:

Equation 2

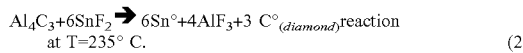

$Al_4C_3 + 6SnF_2 \rightarrow 6Sn° + 4AlF_3 + 3\ C°_{(diamond)}$ reaction at T=235° C. (2)

Equation 3

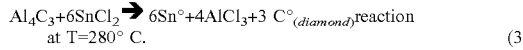

$Al_4C_3 + 6SnCl_2 \rightarrow 6Sn° + 4AlCl_3 + 3\ C°_{(diamond)}$ reaction at T=280° C. (3)

The proof of the diamond, or carbon with sp3 hybridization, material produced was established using X-Ray Diffraction patterns. Early diamond production studied certain metallic catalysts needed to make diamonds. The fact that diamonds were produced using conditions described herein is unexpected and provides support for the methodology described herein.

Since the chemical hypothesis to maintain the sp3 hybridization of pure carbon is confirmed with the production of diamonds, it can extended to include the potential superconducting material to maintain the sp1 hybridization of pure carbon. There have been many different attempts to make this material but none have been successful. The process begins with a carbide that contains carbon in an sp1 hybridized state. As mentioned in the background information, acetylides have the ability to satisfy this requirement. The most common example is calcium carbide ($CaC_2$).

However, sp1 carbon in the acetylide anion can be reconfigured even at very low energy or low temperatures. A more desired reactant is one that has a tendency to maintain the sp1 configuration throughout the rigors of the reaction. The disclosure provides for two compounds that have the ability to act as a sufficient reactant: magnesium sesquicarbide ($Mg_2C_3$) and lithium sesquicarbide ($Li_4C_3$), also mentioned in the background information. From the literature, for example "Crystal Structure of Magnesium Sesquacarbide," Fjellvaag, H., and Karen, P. *Inorganic Chemistry*, Vol. 31 (1992): 3260-3263 which is herein incorporated by reference in its entirety, a structural analysis using X-Ray diffraction was completed and shows that two of the carbon atoms are equivalent with an sp1 configuration. With a hydrolysis reaction, methyl acetylene ($CH_3C_2H$) is produced. One terminal carbon, the methyl carbon ($CH_3$) end is sp3 in nature while the other two carbons maintain their sp1 character. The goal is to polymerize the carbon atoms while maintaining the sp1 configuration. This would produce a new allotrope of carbon that has an sp1 configuration. Due to the electronic properties of such a material, it may be a high temperature superconductor.

Figure 1:
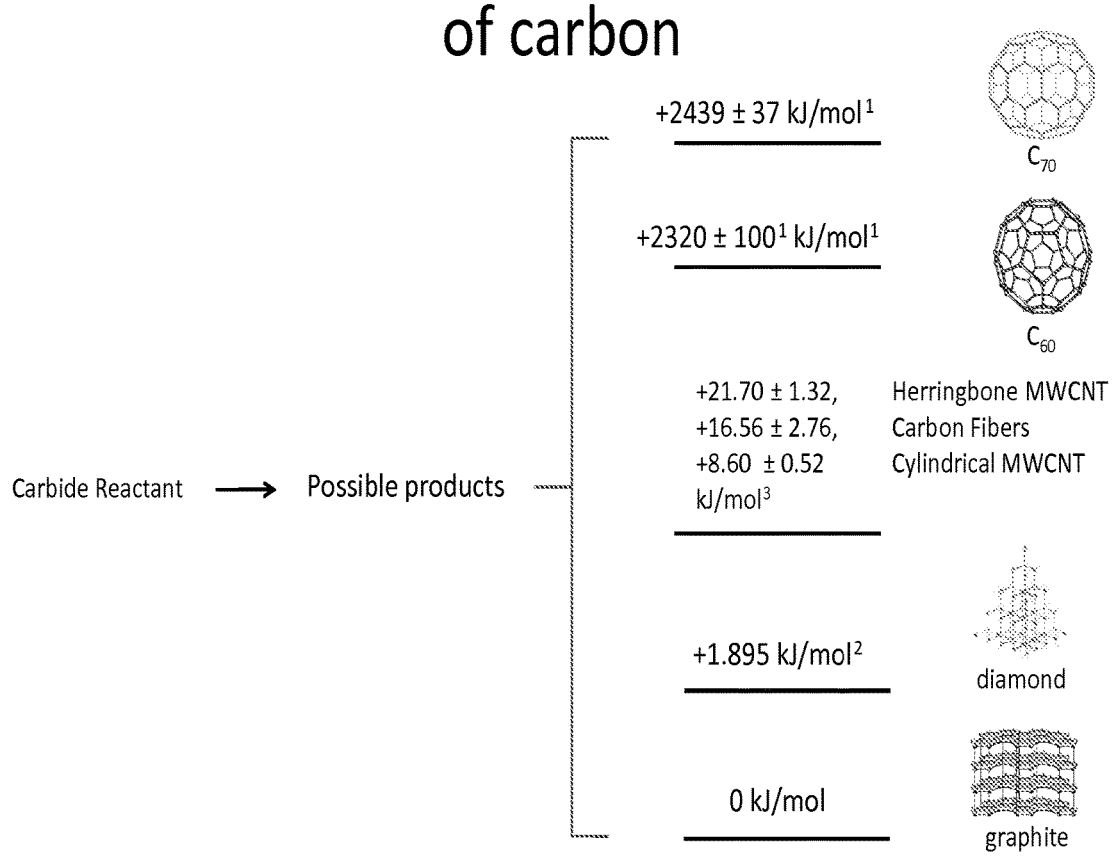
FIG. 1 is a chart that provides the enthalpies of formation for various allotropes of carbon.

In another aspect, about less than 0.5%, about less than 1%, about less than 2%, about less than 3%, about less than 4%, about less than 5%, about less than 7.5%, about less than 10%, about less than 15%, about less than 20%, about less than 25%, about less than 30%, about less than 35%, about less than 40%, about less than 45%, about less than 50%, about less than 60%, or about less than 75% of the total yield includes material with a diamond structure, for example, an sp3 carbon structure. In another aspect, about more than 0.5%, about more than 1%, about more than 2%, about more than 3%, about more than 4%, about more than 5%, about more than 7.5%, about more than 10%, about more than 15%, about more than 20%, about more than 25%, about more than 30%, about more than 35%, about more than 40%, about more than 45%, about more than 50%, about more than 60%, or about more than 75%, about more than 85%, or about more than 95% of the total yield includes material with a diamond structure. In yet another aspect, about 0.1% to about 1%, about 0.5% to about 2%, about 1% to about 2%, about 2% to about 5%, about 2% to about 7.5%, about 0.5% to about 10%, about 3% to about 10%, about 5% to about 10%, about 5% to about 25%, about 0.1% to about 35%, about 0.1% to about 40%, about 0.1% to about 50%, about 1% to about 50%, about 5% to about 50%, about 10% to about 50%, about 15% to about 50%, about 25% to about 50%, or about 1% to about 95% of the total yield includes material with a diamond structure. In an aspect, the yields of diamond are relative to the "possible" products described in FIG. 1.

In another aspect, about less than 0.5%, about less than 1%, about less than 2%, about less than 3%, about less than 4%, about less than 5%, about less than 7.5%, about less than 10%, about less than 15%, about less than 20%, about less than 25%, about less than 30%, about less than 35%, about less than 40%, about less than 45%, about less than 50%, about less than 60%, or about less than 75% of the yield includes material with a diamond structure relative to the amount of graphene and amorphous carbon also recovered. In another aspect, about more than 0.5%, about more than 1%, about more than 2%, about more than 3%, about more than 4%, about more than 5%, about more than 7.5%, about more than 10%, about more than 15%, about more than 20%, about more than 25%, about more than 30%, about more than 35%, about more than 40%, about more than 45%, about more than 50%, about more than 60%, or about more than 75%, about more than 85%, or about more than 95% of the yield includes material with a diamond structure relative to the amount of graphene and amorphous carbon also recovered. In yet another aspect, about 0.1% to about 1%, about 0.5% to about 2%, about 1% to about 2%, about 2% to about 5%, about 2% to about 7.5%, about 0.5% to about 10%, about 3% to about 10%, about 5% to about 10%, about 5% to about 25%, about 0.1% to about 35%, about 0.1% to about 40%, about 0.1% to about 50%, about 1% to about 50%, about 5% to about 50%, about 10% to about 50%, about 15% to about 50%, about 25% to about 50%, or about 1% to about 95% of the yield includes material with a diamond structure relative to the amount of graphene and amorphous carbon also recovered.

In another aspect, the disclosure provides for a process wherein the yield from the carbide starting material is more than about 5% pure carbon, more than about 10% pure carbon, more than about 20% pure carbon, more than about 30% pure carbon, more than about 40% pure carbon, more than 50% pure carbon, more than 60% pure carbon, more than 70% pure carbon, about more than 80% pure carbon, more than 90% pure carbon, or more than 95% pure carbon.

As discussed in the Chemical Reaction section, in an aspect, diamond growth occurs at one vertical level inside the reactor, for example, at steady state with no agitation, where the reactants meet at the proper conditions. The reaction that occurs is exothermic, which means that it gives off heat. As the reaction progresses more heat is generated and that heat is transferred through the rest of the reactor. Using the reaction conditions described in, for example, Examples 1-3 heat is generated at the reaction site at a greater rate than is transferred away from the reaction site. This means that as the reaction progresses and the diamond crystal grows this area inside of the reactor will continue to increase in temperature. If the temperature at the reaction site increases above a certain level the thermodynamics of the reaction will change. Specifically, if the temperature gets too high, the reaction will cease producing diamonds and begin producing sp2 carbon. As this new reaction progresses, the sp2 carbon will encapsulate the diamond and the growth of the crystal will stop. The diamond crystal will then have a coating (armoring) of sp2 carbon at the surface.

Use of Inert Material to Alter the Heat and Mass Transfer of the Reaction and Increase the Area of the Reaction Zone:

In addition to the carbide and metallic salt, in an aspect, additional materials can be added to the reactor in order to alter the heat transfer and mass transfer during the chemical reaction step of the process. In an aspect, additional materials can be any material that is inert relative to the respective reactant and can withstand the conditions (for example, temperature, molten salt) inside the reactor. Examples include ceramic pellets or stainless steel ball bearings. These materials can also increase the overall surface area or volume of the physical zone in the reactor where the chemical reaction takes place. These materials are inert and therefore remain unchanged by the chemical reaction. In an aspect, the disclosure provides for a method of altering the heat transfer and mass transfer properties inside the reactor via the addition of excess reactant or inert materials that remain chemically unchanged by the reaction. In another aspect, in addition the carbide and metallic salt used as reactants, inert material, catalysts (such as $FeCl_3$) and additives such as dopants to alter the properties of the diamonds produced are added to the reactor and can be utilized with the methodologies described herein.

(3) Product Separation:

Reduction of Elemental Metal from the Products of Reaction:

The products of the carbon producing reaction include elemental metals which can be removed. In an aspect, removal of these metals from the other products of reaction can be accomplished by using a reducing agent such as hydrochloric acid (HCl). In another aspect, any acid which oxidizes the elemental metal produced can be used in the separation. One key feature is to oxidize the metal, therefore removing it, while leaving the diamonds (sp3 carbon) unchanged. The acid can also leave the sp2 and mixed hybridized carbon unchanged to allow the opportunity to examine the sp2 and mixed hybridized carbon produced in the future for additional products from the process. One potential use of the nondiamond product is in super capacitors. Once the reaction is complete and the stainless steel transfer tube opened, the products of reaction are transferred to a separation vessel made of polypropylene. In an aspect, the separation vessel is made of any material that is inert to acids used to remove the elemental metals and metal oxides as well as any other solvents needed for the separation process. In addition, the vessel should also be able to withstand the enhanced gravity of the centrifuge which is also used for the separation process.

Use of Surfactants in the Separation Process:

During the separation process, salts and sp2 and mixed hybridized carbon act as a glue to hold the particles together. The liquids used to dissolve away the salts which are mostly water and alcohols and acids, create films and agglomerates which act to hold the particles together, particularly the very fine particle size diamonds. The addition of surfactants acts to breakup any films and helps to separate the particles so they can be more easily dissolved or dispersed by the liquids. In addition to separating the particles for dissolving, the surfactant solutions act like a soap and force any undesired material from the surface of the diamonds. Another advantage to the surfactant solutions in the separation process is decreasing or increasing the settling rate of the fine material. Once the acids remove the elemental metals, the densest material remaining is diamonds. Therefore the diamonds settle first based on the particle size. The finer particle size diamonds remain suspended in the solution due to Brownian motion. The surfactant solution changes the surface tension of the water used to dissolve the salts. This lower surface tension allows the finer particle size diamonds to settle out of solution at different rates.

In another aspect, surfactants may also allow a better separation of the diamonds from the other material. In another aspect, different surfactants or surfactant mixtures can be used to separate out the various products, and even separate the diamonds produced in the reaction into various groups of different particle sizes. In another aspect, a silicone-based surfactant can be used with the methodology described herein. Suitable surfactants for use with the described methodology include those described in "*Surfactants: A Practical Handbook*," Lange, Robert K. Philadelphia, Pa.: Hanser Gardner Publications, Inc., 1999, the contents of which are herein incorporated by reference in their entirety.

In an aspect, the disclosure provides for a method for recovering the fine particle sized desired products from the water, alcohol, surfactant solution, heavy media or acids used in the separation process by filtering the fine particles from the solutions.

Gravity Separation of the Diamonds Using Dense or Heavy Media:

The diamonds produced in the reaction can be separated from the other products of reaction based on the differences in specific gravity of the materials. For example, the products of the chemical reaction can be added to perchloroethylene a liquid with a specific gravity of about 1.6, dibromomethane, specific gravity=2.4, and/or halogenated organic compounds used for gravity separation, specific gravity>2.0. Diamonds, with a specific gravity of about 3.3 will sink in the liquid and be separated from any material with a specific gravity less than 1.6 which will float on the surface of the perchlorotheylene. The gravity separation can be used for composite particles in the Separation Step as well as for diamonds in the Purification Step. In another aspect, any chemical material or chemical compound can be used during this step based on the difference in specific gravity between the composition of interest, for example a diamond, and a chemical material or chemical compound to be separated.

Removal of Un-Reacted Carbides:

It is unlikely that all the reactants in the process will be completely consumed by the reaction and converted to products, especially at reaction conditions optimized for economics of the process. Therefore, un-reacted carbide will remain in the products of reaction and have to removed or separated. The un-reacted carbide readily reacts with water to produce hydrocarbon gases and metal oxide. In many cases, the metal oxide is easily reacted away using the acid. Therefore in the transfer step from the reactor to the separation vessel using the acid, water reacts with the carbide to produce acetylene and a metal oxide which is then reacted by the acid. If there is any remaining un-reacted carbide in the products of reaction after the acid treatment, it can be reacted with water or water in the surfactant solution. Due to subsequent treatments with acids in the following steps, the metal oxide produced will eventually be reacted and removed from the products of reaction.

In an aspect, the disclosure provides for a method of removing un-reacted carbide from the respective targeted products of the reaction by reacting the carbide with water and further reacting the metal oxide produced with acid.

Removal of Un-Reacted Metallic Salts and Metallic Salts Produced in the Reaction:

The removal of the metallic salts produced by the reaction can be accomplished using water or a surfactant solution, alcohols, or acids. During the separation process the products of reaction are transferred into a separation vessel. The liquid which dissolves the un-reacted metallic salts and the metallic salts produced in the reaction can be added to the separation vessel and agitated for a period of time. The separation vessel can then be left to settle and the liquid which dissolved the metallic salts decanted off or removed. To accelerate the process and also to perform a better separation where the solid material is forced out of solution, the separation vessels are placed in the bucket centrifuge. In an aspect, the liquid in the separation vessel still contains the dissolved salts, which can now be removed.

In an aspect, the disclosure provides for a method of removing the un-reacted metallic salts and the metallic salts produced by the reaction from the products of the reaction by dissolving the un-reacted products in water, alcohols, surfactant solutions, or acids.

In another aspect, the disclosure provides for a method of separating and dispersing individual solid particles from the respective reaction products with the use of surfactant solutions. In another aspect, the method of separating and dispersing individual solid particles from the respective reaction further comprises removing undesired, non-targeted, or trace products of the reaction by dissolving and/or reacting undesired, non-targeted, or trace products and subsequently removing from the mixture. In yet another aspect, the desired products remain chemically unchanged by the reaction and can be purified and classified into different products.

In another aspect, the disclosure provides for a method of separating, removing, and/or classifying of undesired products of reaction by specific gravity using heavy media liquids and/or surfactant solutions.

Reaction Separation of Elemental Metal from the Products of Reaction:

Elemental metal produced in the reactions described herein can also be removed using other materials (for example, dibromomethane) that diffuses into the composite particles and reacts with any elemental metals produced in the reaction. Dibromomethane, for example, has the ability to diffuse into the composite particles of the products of reaction and react with the encapsulated metals. This method allows for all of the elemental metal produced to be removed in a single step prior to the removal of the sp2 carbon, which separates any of the remaining composite particles. In an aspect, the products of reaction are exposed to the material (for example, dibromomethane) for an adequate resonance time to allow the diffusion into the composite particle and reaction with the elemental metal. An example of an adequate resonance is several hours to several days. In another aspect, an example of an adequate resonance is about 2 or more hours, about 5 or more hours, about 12 or more hours, about 1 or more days, about 2 or more days, about 3 or more days, or about 5 or more days. In another aspect, an example of an adequate resonance is about 1 to about 4 hours, about 2 to about 12 hours, about 2 hours to about 1 day, about 6 hours to about 2 days, about 12 hours to about 2 days, or about 1 hour to about 3 days. This rate of this reaction is governed by the diffusion of the species into the composite particles. Therefore, an adequate resonance time will depend primarily on the size of the composite particles and/or the viscosity of the liquid reaction medium.

In an aspect, the disclosure provides for a method of removing the elemental metal from the products of reaction of other material (for instance, dibromomethane) that have the ability to diffuse into composite particles and reduce the elemental metal.

Removal of Metal Oxides from the Products of Reaction:

Many of the reactants used herein produce metal oxides that can be reacted by various acids. However, there are reactants, for example, aluminum carbide, which produce a metal oxide that does not react with acid. In the case of aluminum oxide it produces a product called alumina or aluminum oxide. Aluminum oxide is very stable and does not react with the acids. But it can be reacted by a solution of potassium hydroxide. Due to the use of the potassium hydroxide solution, this is a more difficult separation because it requires the addition of heat for the potassium hydroxide to remain in solution.

Recovery of the Fine Particle Size Solids During the Separation Step:

While separating the reacted elemental metals and dissolved metallic salts from the elemental carbon, the liquid removed still contain a small percentage of solid composite particles. In an aspect, the liquid removed contains, for example, about less than 0.5%, about less than 1%, about less than 2%, about less than 3%, about less than 4%, about less than 5%, about less than 7.5%, about less than 10%, about less than 15%, about less than 20%, about less than 25% of solid composite materials. In another aspect, the liquid removed contains, for example, about 0.1% to about 1%, about 0.5% to about 2%, about 1% to about 2%, about 2% to about 5%, about 2% to about 7.5%, about 0.5% to about 10%, about 3% to about 10%, about 5% to about 10%, about 5% to about 25%, or about 0.1% to about 35%, of solid composite material. In an aspect, the solid composite material contains diamonds along with other products of reaction. These composite particles can be recovered from the supernatant liquid using filtration or gravity separation. The recovered material can be further processed to recover the diamonds produced.

Recovery of the Alcohol Solvents:

In an aspect, the disclosure provides for a system for recovery of alcohols and heavy medium liquid. The recovery of solvents is likely to become important as the scale is increased in order to accommodate commercialization. An example recovery system for the alcohols is described herein.

(4) Product Purification:

The diamond purification aspect is an additional step in the process which removes the products of reaction that are not sp3 carbon (diamond). This step begins with the removal of the sp2 carbon from the products of reaction. In an aspect, the removal of the sp2 and mixed hybridized carbon can be accomplished with two different oxidative procedures, the oxidation of the sp2 and mixed hybridized carbon in a hot oven and/the oxidation of the sp2 and mixed hybridized in strong oxidative solutions, such as $H_2O_2$ or $HNO_3$. Depending on the initial reactants and reaction conditions used for the process, both methods can be utilized to completely remove the sp2 carbon.

After the sp2 and mixed hybridized carbon is removed, the Purification part of the process will be similar to the separation part which is why we believe we will eventually be able to combine them into one part of the process. The Purification part of the process has achieved very good results, especially in removing the sp2 and mixed hybridized carbon.

In an aspect, the disclosure provides for method of reacting the sp2 hybridized carbon from the remaining elemental carbon using concentrated acids while leaving the remaining elemental carbon unchanged. The disclosure further provides for a method of removing the sp2 hybridized carbon from the remaining elemental carbon by dispersing the sp2 carbon in a surfactant solution while leaving the remaining elemental carbon unchanged. In yet another aspect, the disclosure provides for a method of removing the sp2 hybridized carbon from the remaining elemental carbon and classifying the remaining elemental carbon into particle sizes using heavy media liquid or combinations of heavy media liquids.

Chemical Reaction to Remove the Sp2 Carbon:

A factor in removing the sp2 and mixed hybridized carbon from the products of reaction is to perform this task while leaving the diamonds (or sp3 carbon) unchanged by the process. In addition to oxidizing the sp2 carbon to remove it, another option is to react the sp2 carbon using one or more chemicals under the proper reaction conditions. One example is the use of trifluoroacetic acid and concentrated hydrogen peroxide.

Use of Surfactants in the Purification Step:

In an aspect, the use of surfactants in the purification process is nearly identical to 'Use of Surfactants in the Separation Step." One difference is the reduced particle size of the material in the purification step and the absence of sp2 and mixed hybridized carbon which will alter the conditions produced by the surfactant or surfactant mixture.

Recovery of the Fine Particle Size Diamonds During the Purification Step:

This item is similar to the 'Recovery of the Fine Particle Size Solids during the Separation Step'. One difference is that at this point in the process, the solid material to be recovered is diamond and not a composite particle. In addition, the particle size of the solids will be decreased. In an aspect, the recovery method will include filtration or gravity separation.

EXAMPLES

Example 1

In an oxygen moisture free environment, aluminum carbide, $Al_4C_3$ was ground to less than 20 mesh. A quantity of anhydrous stannous chloride, $SnCl_2$ was blended with the ground aluminum carbide at twice the stoichiometric ratio for the reaction below

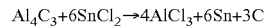
$Al_4C_3 + 6SnCl_2 \rightarrow 4AlCl_3 + 6Sn + 3C$

The blend was poured into a glass ampoule that was subsequently placed into a stainless steel tube. The stainless steel tube was sealed and removed from the controlled environment. The tube and its contents were heated to 280° C. for 2 hours. The contents of the ampoule were washed with 6M HCl to remove all the aluminum chloride, excess stannous chloride and Sn metal. The remaining carbon was in two forms (1) a graphene like compressed set of platelets and (2) a cubic/orthorhombic diamond like structure. The preponderance of the carbon product was the latter structure.

Example 2

In an oxygen moisture free environment, calcium carbide, $CaC_2$ was ground to less than 20 mesh. A quantity of anhydrous zinc chloride, $ZnCl_2$ was blended with the ground aluminum carbide at twice the stoichiometric ratio for the reaction below

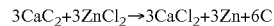
$3CaC_2 + 3ZnCl_2 \rightarrow 3CaCl_2 + 3Zn + 6C$

The blend was poured into a glass ampoule that was subsequently placed in a stainless steel tube. The stainless steel tube was sealed and removed from the controlled environment. The tube and its contents were heated to 425° C. for 2 hours. The contents of the ampoule were washed with 6M HCl to remove all the Zinc chloride, calcium chloride, and Zn metal. The remaining carbon was in two forms (1) a graphene like compressed set of platelets and (2) a cubic/orthorhombic diamond like structure. The preponderance of the carbon product was the latter structure.

Example 3

In an oxygen moisture free environment, calcium carbide, $CaC_2$ was ground to less than 20 mesh. A quantity of anhydrous stannous chloride, $SnCl_2$ was blended with the ground aluminum carbide at twice the stoichiometric ratio for the reaction below

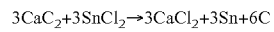
$3CaC_2 + 3SnCl_2 \rightarrow 3CaCl_2 + 3Sn + 6C$

The blend was poured into a glass ampoule that was subsequently placed in a stainless steel tube. The stainless steel tube was sealed and removed from the controlled environment. The tube and its contents were heated to 280° C. for 2 hours. The contents of the ampoule were washed with 6M HCl to remove all the stannous chloride, calcium chloride, and Sn metal. The remaining carbon was in only one form a graphene like compressed set of platelets.

The invention claimed is:

1. A method of producing elemental allotropes of carbon comprising: chemically oxidizing carbide anions in a molten metal salt reactant at a reaction temperature from about 150° C. to about 750° C., wherein the oxidizing reaction produces an allotrope of carbon in an sp1, sp2, and/or sp3 hybridization from the oxidation of the carbide anions and also the reaction produces elemental metal from the reduction of the cation of the metal salt, wherein the chemically oxidizing step takes place in the molten metal salt, and wherein the metal salt is in excess relative to the carbide.

2. The method of claim 1, wherein said carbide anions are salt-like carbide or intermediate transition metal carbide anions.

3. The method of claim 1, wherein said carbide anions are salt-like carbide anions which are methanides, acetylides, and sesquicarbides.

4. The method of claim 1, wherein said carbide anions are salt-like carbide anions which are acetylides.

5. The method of claim 1, wherein said carbide anions are from calcium carbide, magnesium carbide, or aluminum carbide.

6. The method of claim 1, wherein said carbide anions are from calcium carbide.

7. The method of claim 1, wherein the carbide anions are from a carbide having a particle size from 10 microns to 5 mm.

8. The method of claim 1, wherein the carbide anions are from a carbide having a particle size from 30 microns to 200 microns.

9. The method of claim 1, wherein said reaction produces an allotrope of carbon in an sp3 hybridization.

10. The method of claim 1, wherein said reaction produces an allotrope of carbon in an sp2 hybridization.

11. The method of claim 1, wherein said reaction produces an allotrope of carbon in an sp1 hybridization.

12. The method of claim 1, wherein said reaction produces carbon in the form of graphene.

13. The method of claim 1, wherein said reaction produces carbon in the form of platelets.

14. The method of claim 1, wherein said reaction produces amorphous carbon.

15. The method of claim 1, wherein said reaction produces mixed hybridization carbon.

16. The method of claim 1, wherein the carbon product comprises diamond crystal having a coating of sp2 carbon on the surface.

17. The method of claim 1, wherein the yield of carbon from the carbide is more than 10%.

18. The method of claim 1, wherein the yield of carbon from the carbide is more than 30%.

19. The method of claim 1, wherein the yield of carbon from the carbide is more than 70%.

20. The method of claim 1, wherein the carbon product of the reaction is in particle form.

21. The method of claim 1, wherein said reaction temperature is in a range from about 200° C. to about 300° C.

22. The method of claim 1, wherein said reaction temperature is from about 400° C. to about 600° C.

23. The method of claim 1, wherein said reaction temperature is in a range from about 250° C. to about 400° C.

24. The method of claim 1, wherein the reaction temperature is high enough to melt an added metal salt but low enough control the hybridization of the carbon.

25. The method of claim 1, wherein the oxidizing reaction is carried out at a temperature below 500° C.

26. The method of claim 1, wherein the oxidizing reaction is carried out at a temperature below 400° C.

27. The method of claim 1, wherein the oxidizing reaction is carried out at a temperature below 300° C.

28. The method of claim 1, wherein said reaction further comprises adding a salt with a melting point of less than 280° C. as a reactant.

29. The method of claim 1, wherein said reaction further comprises using a salt for the oxidizing reaction with a melting point of less than 280° C. as a reactant.

30. The method of claim 1, wherein the excess is at least twice the stoichiometric ratio.

31. The method of claim 1, wherein the reaction takes place under an environment that is void or substantially void of oxygen and/or moisture.

32. The method of claim 1, wherein the oxidizing reaction is carried out without agitation.

33. The method of claim 1, wherein the oxidizing reaction is carried out with agitation.

34. The method of claim 1, wherein the oxidizing reaction is carried out in a sealed reactor which is loaded at atmospheric pressure and heated.

35. The method of claim 1, wherein the oxidizing reaction is carried out in a horizontally oriented reactor.

36. The method of claim 1, wherein the oxidizing reaction is carried out in stacked reactors.

37. The method of claim 1, wherein the reaction is carried out with an additional material added to the reactor to alter heat and mass transfer during the reaction.

38. The method of claim 1, wherein the reaction is carried out with use of dopants.

39. The method of claim 1, wherein after the reaction is complete, the products of reaction are transferred to a separation vessel.

40. The method of claim 1, wherein the product of the reaction is separated with use of surfactant.

41. The method of claim 1, wherein the product of the reaction is separated with use of gravity separation.

42. The method of claim 1, wherein after the reaction unreacted carbide is removed with use of water and acid.

43. The method of claim 1, wherein after the reaction metal salts are removed with water, alcohol, surfactant, or acid.

44. The method of claim 1, wherein after the reaction the reaction products are subjected to oxidation in a hot oven or a strong oxidative solution.

45. The method of claim 1, wherein after the reaction the carbon is classified according to particle size.

46. The method of claim 1, wherein as part of producing the allotrope of carbon, the method further comprising removing material that is not element carbon from the products of the oxidizing reaction, and also removing any undesired elemental carbon produced by the oxidizing reaction.

47. The method of claim 1, the method consisting essentially of: oxidizing carbide anions at a reaction temperature from about 150° C. to about 750° C., wherein the oxidizing reaction produces an allotrope of carbon in an sp1, sp2, and/or sp3 hybridization, and separating and purifying the carbon product.

48. A method of producing elemental allotropes of carbon comprising: chemically oxidizing salt-like carbide anion reactant and/or intermediate transition metal carbide anion reactant in a molten metal salt at a reaction temperature from about 150° C. to about 750° C. to form carbon from the oxidation of the carbide anion and also to form elemental metal from the reduction of the cation of the metal salt, wherein the chemically oxidizing step takes place in the molten metal salt, and wherein the metal salt is in excess relative to the carbide.

49. The method of claim 48, wherein said carbide anion is from salt-like carbide anion which is a methanide, an acetylide, or a sesquicarbide.

50. The method of claim 48, wherein said carbide anion is from calcium carbide, magnesium carbide, or aluminum carbide.

51. The method of claim 48, wherein the carbide anion is from a carbide having a particle size from 10 microns to 5 mm.

52. The method of claim 48, wherein the carbide anion is from a carbide having a particle size from 30 microns to 200 microns.

53. The method of claim 48, wherein the reaction produces elemental allotropes of carbon with an sp1, sp2, and/or sp3 hybridization.

54. The method of claim 48, wherein said reaction produces an elemental allotrope of carbon with an sp3 hybridization.

55. The method of claim 48, wherein said reaction produces an elemental allotrope of carbon with an sp2 hybridization.

56. The method of claim 48, wherein said reaction produces an elemental allotrope of carbon with an sp1 hybridization.

57. The method of claim 48, wherein said reaction produces carbon in the form of graphene.

58. The method of claim 48, wherein said reaction produces carbon in the form of platelets.

59. The method of claim 48, wherein said reaction produces amorphous carbon.

60. The method of claim 48, wherein said reaction produces mixed hybridization carbon.

61. The method of claim 48, wherein the yield of carbon from the carbide starting material is more than 10%.

62. The method of claim 48, wherein the yield of carbon from the carbide starting material is more than 30%.

63. The method of claim 48, wherein the yield of carbon from the carbide starting material is more than 70%.

64. The method of claim 48, wherein the product of the reaction is in particle form.

65. The method of claim 48, wherein said reaction comprises reacting as the carbide anion a sesquicarbide with a molten metallic halide salt to produce an allotrope of carbon in the sp1 hybridization.

66. The method of claim 48, wherein said reaction temperature is from about 200° C. to about 300° C.

67. The method of claim 48, wherein said reaction temperature is in a range from about 400° C. to about 600° C.

68. The method of claim 48, wherein said reaction temperature is in a range from about 250° C. to about 400° C.

69. The method of claim 48, wherein the reaction temperature is high enough to melt an added metal salt but low enough control the hybridization of the carbon.

70. The method of claim 48, wherein the oxidizing reaction is carried out at a temperature below 500° C.

71. The method of claim 48, wherein the oxidizing reaction is carried out at a temperature below 400° C.

72. The method of claim 48, wherein the oxidizing reaction is carried out at a temperature below 300° C.

73. The method of claim 48, wherein the reaction further comprises utilizing a salt with a melting point of less than 280° C. as a reactant.

74. The method of claim 48, wherein said reaction further comprises adding a salt with a melting point of less than 280° C. as a reactant.

75. The method of claim 48, wherein the excess is at least twice the stoichiometric ratio.

76. The method of claim 48, wherein the reaction takes place under an environment that is void or substantially void of oxygen and/or moisture.

77. The method of claim 48, wherein the reaction is carried out with use of dopants.

78. The method of claim 48, wherein the product of the reaction is separated with use of surfactant.

79. The method of claim 48, wherein the product of the reaction is separated with use of gravity separation.

80. The method of claim 48, wherein after reaction the reaction products are subjected to oxidation in a hot oven or a strong oxidative solution.

81. The method of claim 48, wherein after reaction the carbon is classified according to particle size.

82. The method of claim 48, wherein the method further comprises removing material that is not element carbon from the products of the oxidizing reaction, and also removing any undesired elemental carbon produced by the oxidizing reaction.

83. The method of claim 48, the method consisting essentially of oxidizing salt-like carbide anions at a reaction temperature from about 150° C. to about 750° C., and separating and purifying the oxidation product.

* * * * *